United States Patent [19]

Plutt

[11] Patent Number: 5,143,459
[45] Date of Patent: Sep. 1, 1992

[54] BAYONET SPINDLE MOUNT AND A METHOD THEREFORE

[75] Inventor: Daniel J. Plutt, Boulder, Colo.

[73] Assignee: Storage Technology Corporation, Louisville, Colo.

[21] Appl. No.: 633,782

[22] Filed: Dec. 26, 1990

[51] Int. Cl.⁵ .............................................. F16C 43/00
[52] U.S. Cl. .................................... 384/537; 403/26; 403/261; 360/98.07
[58] Field of Search ............... 384/609, 215, 217, 227, 384/295, 428, 439, 493, 537, 539, 584, 585; 403/26, 261; 360/98.07, 98.08, 99.04, 99.08

[56] References Cited

U.S. PATENT DOCUMENTS

| | | | |
|---|---|---|---|
| 3,047,869 | 7/1962 | Marcum et al. | 360/98.07 |
| 4,624,585 | 11/1986 | Nix et al. | 384/295 |
| 4,677,509 | 6/1987 | Nishida et al. | 360/98.07 |
| 4,739,425 | 4/1988 | Dierkes et al. | 360/98.08 |
| 4,793,459 | 12/1988 | Forknall et al. | 384/539 X |
| 4,928,029 | 5/1990 | Wright | 360/99.08 X |
| 4,965,476 | 10/1990 | Lin | 360/98.07 X |
| 5,041,858 | 8/1991 | Yamamichi et al. | 354/286 |

Primary Examiner—Daniel P. Stodola
Assistant Examiner—Tony A. Gayoso
Attorney, Agent, or Firm—Dorr, Carson, Sloan & Peterson

[57] ABSTRACT

A housing having a spindle mount for mounting a spindle supporting magnetic disks for a magnetic data storage disk system. A bearing cap having seals is mounted on the exterior of the housing. A spindle clamp having a male bayonet mount is inserted through the bearing cap and engages a mounting cup having a female bayonet mount. A belleville washer is mounted onto the clamp between the bearing cap and the head portion of the clamp. The clamp and cup are designed so that the washer is compressed as the bayonet mount engages. This exerts a constant uniform pressure on the bearing cup as well as restraining the bayonet mounting from disengaging. The bearing cap is held tightly against the exterior of the housing as well to seal the bearing and the inner housing from the exterior environment.

14 Claims, 3 Drawing Sheets

BAYONET SPINDLE MOUNT AND A METHOD THEREFORE

BACKGROUND OF THE INVENTION

1. Field of the Invention

This invention relates to the field of spindle mounting apparatus, particularly in magnetic data storage disk systems.

2. Statement of the Problem

In magnetic disk drives, the disks are supported on a spindle within a disk drive housing. These spindles are rotatably driven by either an internally mounted motor or an externally mounted motor having a shaft attached to the disk spindle. The disks are driven at relatively high rates of speed with magnetic read/write heads moving radially across the disk for reading or recording data at selective locations on the disks. In disk drives, the relative positioning between the heads and disk requires great precision. This precision can be affected by thermal distortion, by vibration, as well as other factors.

Typically, the spindles are mounted on bearings in the disk drive housings which are attached by screws to bearing caps. The bearing caps, in turn, are attached to the drive housing by screws. This assembly normally requires up to 16 screws to securely attach each end of the spindle to the drive housing.

The use of screws creates several problems. During installation in a clean room environment, mounting with screws can result in particle contamination which can affect the performance of the assembled disk drive.

Further, the use of screws generate inconsistent loading of the spindle. The only reliable procedure of testing the loading of the screws is by gauging the torque on the screws. However, this is affected by the friction of the screws, misalignment with the pilot holes, and other factors. The loading of the spindle is critical, for if the load is too small, the spindle can slip with respect to the base during usage due to temperature cycling, vibration, or shock, causing the hard disk assembly to fail. The attachment by screws also increases the cost of assembly of the disk drive.

Therefore, there exists a need for a spindle clamping arrangement that will reduce the need for screws, reduce the potential for particle contamination, and provide a simpler procedure of assembly that will provide a uniform loading on the spindle.

3. Solution to the Problem

The present invention solves these problems and others by providing a mount to quickly assemble the spindle in a housing without the need for a large number of screws.

The present invention further provides a pre-loaded clamping arrangement applying a consistent and uniform load on the spindle.

The present invention provides a seal to protect the bearings and inner housing from contamination.

These and other solutions will become evident from the following descriptions and drawings.

SUMMARY OF THE INVENTION

The present invention provides a spindle mount for mounting a spindle supporting magnetic disks in a housing. The spindle is rotatably mounted in a mounting cup by a roller bearing. The mounting cup abuts the interior of the housing. The mounting cup contains a longitudinal hole having radially inwardly extending teeth to form a female portion of a bayonet mount. A spindle mounting clamp, which is also hollow, has radially outwardly extending teeth matching up with the spaces formed between the teeth of the mounting cup to form the male portion of a bayonet clamp. The clamp further includes a second end portion forming a head portion having a larger diameter.

A bearing cap having a seal is mounted on the exterior of the housing. The clamp is inserted through the bearing cap and engages the mounting cup through the bayonet mount. A belleville washer is mounted onto the clamp between the bearing cap and the head portion of the clamp. The clamp and cup are designed so that the washer is pre-compressed before bayonet mount engages. This exerts a constant uniform downward pressure on the spindle restraining the bayonet mounting from disengaging. The bearing cap is held tightly against the exterior of the housing as well to seal the bearing and the inner housing from the exterior environment.

Thus, the spindle is quickly mounted without the need for a large number of screws. The spindle is axially loaded to withstand vibrations, shock or thermal distortion. The bearing and disk files are sealed from the exterior environment to protect against contamination.

These and other features will become evident from the detailed description of the preferred embodiment taken in conjunction with the drawings.

DETAILED DESCRIPTION OF THE PREFERRED EMBODIMENT

Figure 1:
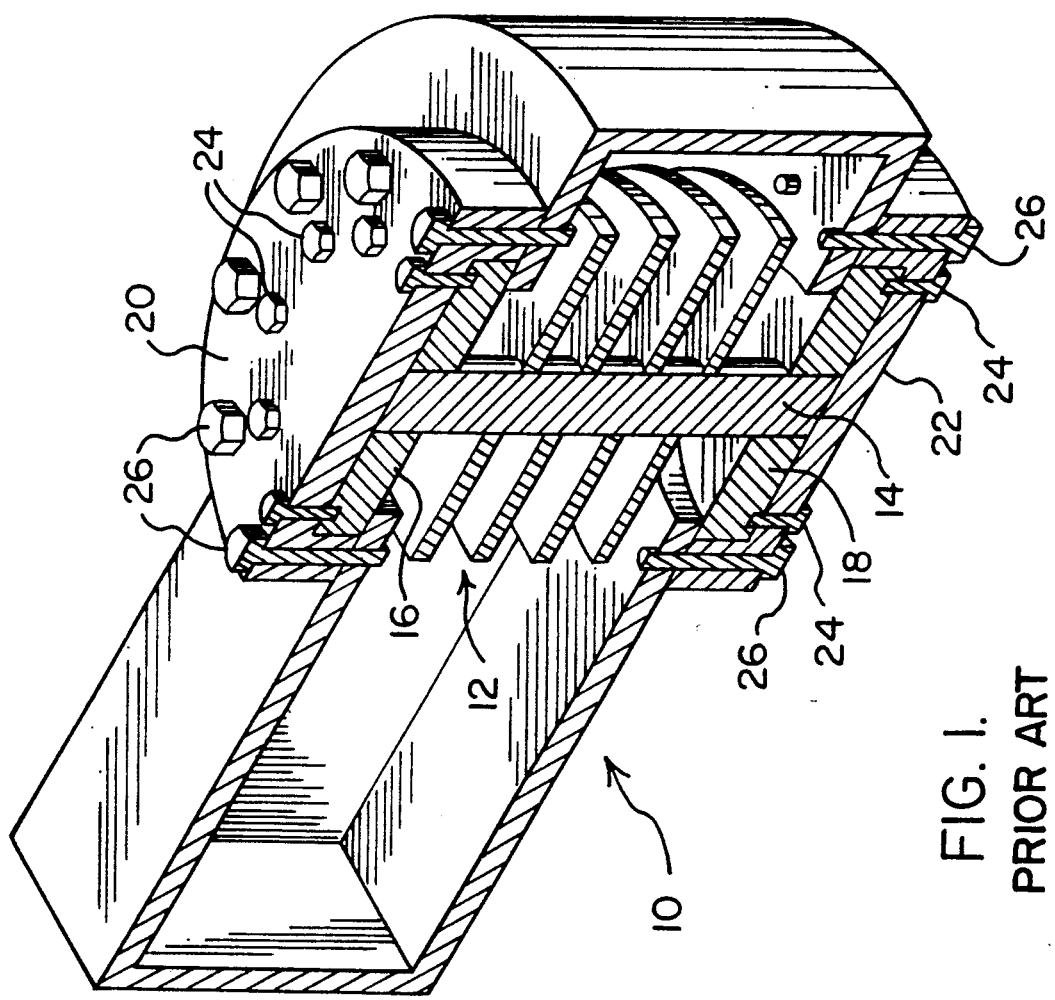
FIG. 1 is a view of a prior art spindle mount in a magnetic data storage disk file system.

A prior art magnetic data storage disk file system 10, as illustrated in FIG. 1, has disks 12 supported on a spindle 14 for relatively high speed rotation. A motor (not shown) engages the spindle 14 to rotate the spindle and disks. Magnetic read/write heads (not shown) move radially across disks 12 to read or record data on selected tracks on the disks.

In disk drives, the relative positioning between the heads and the disks requires great precision. This precision can be detrimentally affected from vibration or shock on the spindle resulting from high speed start ups and rotation of the spindle and disks, from normal usage, from thermal distortion within the housing, and from other factors.

As illustrated in FIG. 1, the prior art devices typically mount spindle 14 to bearings 16 and 18. Bearings 16, 18 are attached to bearing caps 20, 22 by screws 24. Bearing caps 20,22 are then attached to the housing by screws 26. Up to 16 screws for each bearing are required to mount spindle 14 to the housing.

The use of screws in the prior art devices increases the cost of assembly and creates particle contamination due to the waste particles occurring during the screw threading assembly which can shorten the life span of drive.

Figure 2:
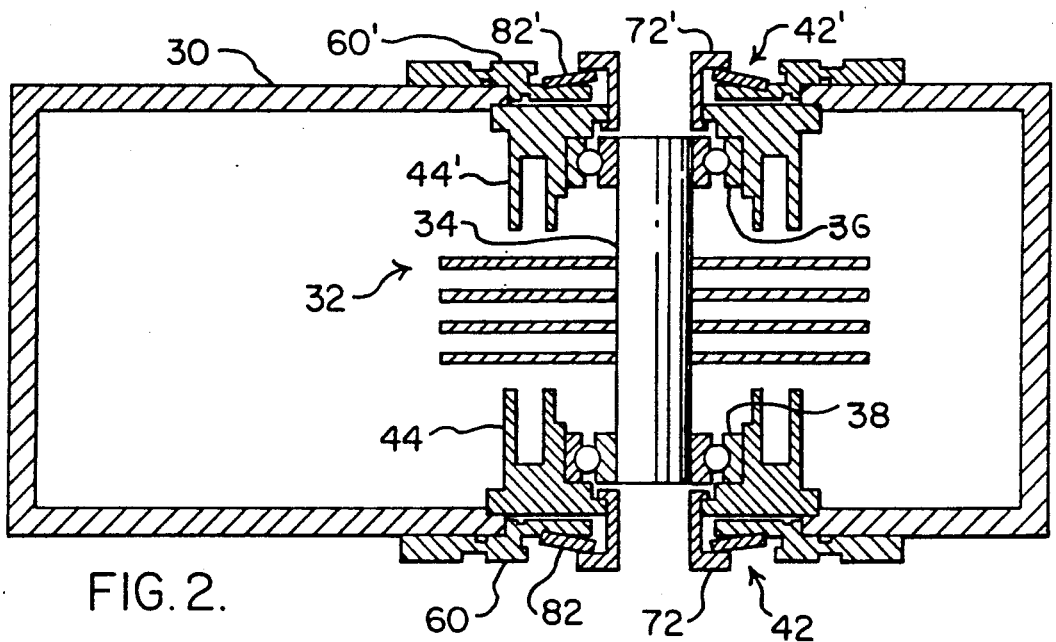
FIG. 2 is a cutaway view of the present invention.

The present invention, as illustrated in FIGS. 2-5, overcomes these problems. The present invention, as shown in one of the preferred embodiments as shown in FIG. 2, includes a housing 30 having a plurality of disks 32 supported by spindle 34 for high speed rotation. Spindle 34 is supported for rotational movement by an upper bearing 36 and a lower bearing 38. Spindle 34 is engaged by a drive motor (not shown) at its lower end. The drive motor and means for attachment to the spindle are well known and do not form a part of this invention.

The spindle mounting apparatus

As illustrated in FIG. 2, spindle 34 is mounted within housing 30 by bayonet spindle clamp devices 42 and 42'. The spindle clamps 42, 42' are of identical design with spindle clamp 42 clamping the lower end of spindle 34 at bearing 38 and spindle clamp 42' clamping the upper end of spindle 34 at bearing 36.

Figure 3:
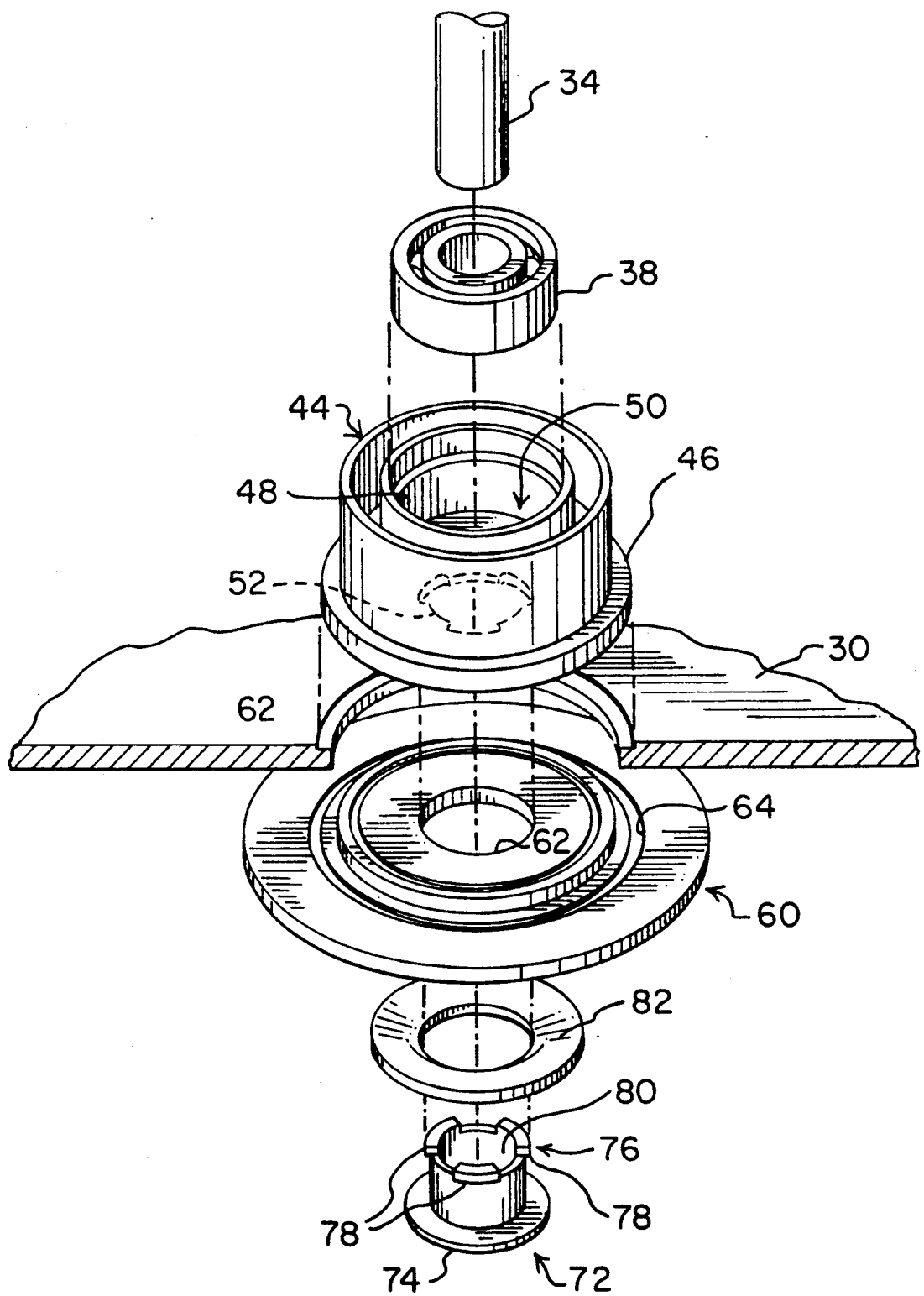
FIG. 3 is an exploded view of a perspective of the present invention.

Spindle clamp device 42 is illustrated in FIGS. 2 and 3. The device 42 includes a bearing cup 44, a mounting clamp 72, a bearing cap 60, and a belleville washer 82. As shown in FIG. 2, spindle clamp 42' has corresponding structure including bearing cup 44', mounting clamp 72', bearing cap 60' and belleville Washer 82'. Only spindle clamp 42 will be further discussed with spindle clamp 42' having similar design and operation.

As shown in FIG. 3, lower bearing 38 is adapted to be mounted within bearing cup 44 to support spindle 34 while allowing free rotation of the spindle. A lower portion 46 is formed on bearing cup 44 adapted to abut against the internal surface of housing 30. This supports spindle 34 as is further discussed below.

Figure 4:
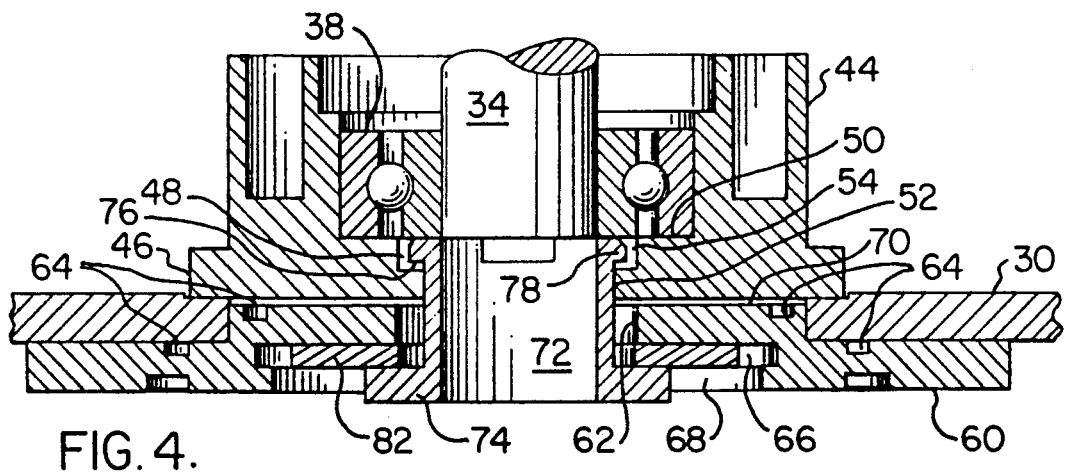
FIG. 4 is a partial view of the present invention during the mounting process.

An inner hole 48 is formed in cup 44 extending along a vertical longitudinal axis of the cup 44. An enlarged portion of hole 48 at the upper end of cup 44 forms a bottom bearing seat 50 for bearing 38. At the lower end 46 of cup 44, radially inward extending teeth 52 are formed as illustrated in FIG. 3. In the embodiment shown in the FIGS. 2 and 3, there are three teeth 52. The claimed invention is not meant to be limited to this description. Other variations forming a bayonet mount, including differing number of teeth and shapes, are considered to be within the scope of the inventive concept. Teeth 52 extend longitudinally inward a predetermined distance. As shown in FIG. 4, inner portion 54 is formed between the rear of teeth 52 and bearing seat 50. The purpose of inner portion 54 is to receive the teeth of the mounting clamp as explained below.

As illustrated in FIG. 4, bearing cap 60 is formed with an inner hole 62, seal groove 64 and recess 66. The upper portion 70 of bearing cap 60 has a reduced diameter to closely fit within an opening formed in the lower housing 30. Bearing cap 60 is designed to be mounted on the external side of the lower housing 30 to protect the inner housing from the exterior environment. Bearing cap 60 is held in place against housing 30 by the spindle mounting clamp itself, or by the use of mounting screws (not shown).

As illustrated in FIG. 3, the mounting clamp 72 is formed in a tubular shape having a lower head portion 74 with an enlarged diameter and an upper toothed portion 76. A belleville washer 82 is adapted to slide over the upper end 76 of the clamp 72. This belleville washer 82 is a cone-disk spring capable of producing a constant load under compression. The purpose of belleville washer is discussed in further detail below.

The upper portion 76 of clamp 72 includes teeth 78 extending radially outward as shown in FIG. 3. Teeth 78 are designed to fit into the spaces between teeth 52 of mounting cup 44. The spaces between teeth 78 are likewise designed to allow teeth 52 to fit through the spaces. Teeth 78 extend longitudinally a predetermined distance to fit into inner portion 54 of cup 44 without interfering with the bearing 38 as shown in FIG. 4.

The outer diameter of teeth 78 is less than the internal diameter of hole 62 of bearing cap 60. Clamp 72 is designed for upper portion 76 to fit through hole 62 of bearing cap 60 as shown in FIG. 3. Upper portion 76 is adapted to be inserted into hole 48 of mounting cup 44 with teeth 78 fitting between teeth 52 of mounting cup 44. Once clamp 72 is fully inserted into mounting cup 44, so teeth 78 are in inner portion 54, clamp 72 is rotated relative to cup 44 a limited distance to prevent teeth 78 from disengaging from cup 44. Other types of bayonet mounts are contemplated as within the scope of the inventive concept.

Figure 5:
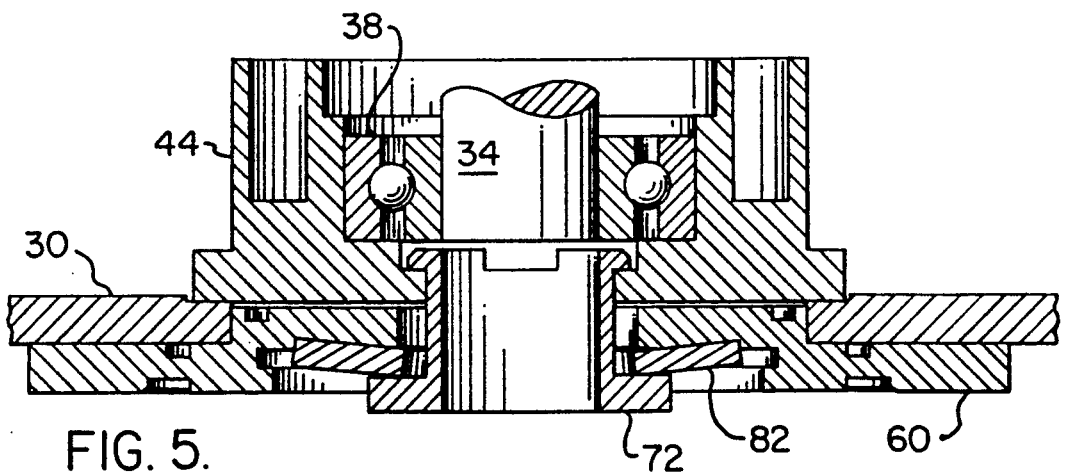
FIG. 5 is a partial view of the mounted invention.

Washer 82 is compressed by an external force (not shown) before clamp 72 is fully inserted into cup 44 as shown in FIG. 4. Once clamp 72 is full inserted into cup 44 so that teeth 76 are in inner portion 54, the clamp 72 is rotated relative to cup 44 so that teeth 76 are no longer aligned with the spaces between teeth 52 of cup 44. After clamp 72 is rotated, the force against the external side of clamp 72 is released. The force of the compressed washer 82 biases clamp 72 in the direction away from cup 44, forcing the lower surface of teeth 78 of the clamp against the upper surface of the rear of teeth 52 of the cup as illustrated in FIG. 5. The claimed invention is not meant to be limited in scope to the use of a belleville washer. Other types of resilient biasing structures are contemplated as being within the range of the invention as claimed.

This force from the belleville washer can be chosen by altering the size of the washer or by stacking washers together. The force from belleville washer 82 prevents clamp 72 and cup 44 from disengaging to secure the mounting cup 44 and spindle 34 to the housing 30. This force provides a consistent, uniform load on the bearing cups and the base structure to keep the spindle securely attached to the base during shock, vibration and thermal distortion.

The reaction of the compressed washer 82 acting against bearing cap 60 creates a tight seal between bearing cap 60 and the exterior of the housing 30 as shown in FIG. 5. A well known type of seal (not shown) can also be placed in the groove 64 to further seal the bearing 38 and internal housing from the exterior environment.

Few or no screws are necessary for this mounting. The mounting can easily occur in a clean room environment without creating contamination of the system.

A method of mounting the spindle

Spindle 34 has upper bearing 36 and lower bearing 38 mounted onto it by well known means as shown in FIG. 2. Lower bearing 38 is mounted in bearing bottom seat 50 of mounting cup 44. Bearing cap 60 is mounted in the opening of housing 30, by screws if desired. A seal is mounted in groove 64 to lie between cap 60 and external housing 30.

Belleville washer 82 is mounted over upper portion 76 of clamp 72. Teeth 78 of clamp 72 are aligned with the spaces between teeth 54 of cup 44. The upper portion 76 of clamp 72 is inserted through bearing cap 60 and into cup 44.

An external force is applied between clamp 72 and cap 60 until belleville washer 82 is compressed to allow zero force of insertion of the clamp assembly into bearing cup 44. Clamp 72 is fully inserted in cup 44 until teeth 78 are the inner portion 54 of the cup. Clamp 72 is then rotated relative to cup 44 until teeth 78 are aligned with teeth 56 of cup 44. The external force is then removed, with the resultant force being picked up by the housing, the cup, and the cap. Upper bearing 36 is attached to spindle 34 and housing 30 by similar steps.

The above description of the preferred embodiment is for descriptive purposes only. The description is not meant to limit the scope of the concept of the invention as claimed. Other variations and modifications are considered to be within the scope of the claimed invention.

The present invention, as set forth in the claims, provides an apparatus for quickly mounting a spindle in a housing without the need for additional screws, thus reducing the particle contamination and inconsistent loading on the disk drive assembly. This invention provides resists contamination of the system while providing a consistent and uniform load on the spindle bearings.

I claim:

1. An apparatus for mounting a spindle for rotation in a housing, said apparatus comprising:
   a spindle;
   a housing for containing said spindle
   bearing means for rotatably mounting said spindle;
   a circular mounting cap having an upper portion for receiving said bearing means;
   means for clamping said mounting cup to a first surface inside said housing;
   said clamping means comprising:
   a tubular clamp having a lower end abutting against a second surface on the outside of said housing to clamp said cup against said first surface on the inside of said housing;
   first teeth formed around the outer circumference of the upper end of said clamp, said first teeth extending radially outward a predetermined distance from the longitudinal axis of said clamp and extending longitudinally inward a predetermined distance from said upper end of said clamp;
   an inner hole formed in the lower end of said cup extending longitudinally at least partway into said cup;
   second teeth formed about the inner circumference in said inner hole at said lower end of said cup, said second teeth extending radially inward a predetermined distance from said inner hole and extending longitudinally inward a predetermined distance from said lower end;
   wherein said first teeth are inserted in the spaced formed between said second teeth and said second teeth are inserted in the spaces between said first teeth so that said upper end of said clamp can be inserted into said inner hole of said cup;
   said predetermined distances being such that after said upper end of said clamp has been fully inserted into said cup, said cup and said clamp are rotatable relative to one another to lock said cup and said clamp from disengagement from each other and to clamp said cup against said first surface on the inside of said housing;
   spring means to resiliently bias said first teeth of said clamp against said second teeth of said cup to restrain said clamp and said cup from disengaging from each other and to axially preload said spindle to isolate said spindle and said bearing from vibrations and shock; and
   bearing cap means mounted between said spring means and said housing for sealing the interior of said housing from the exterior environment by the spring means biasing said bearing cap means against the exterior of the housing.

2. The apparatus of claim 1 wherein said spring means comprises at least one belleville washer mounted between said clamp and said cup, said washer being compressible to form said resilient biasing means as said clamp and said cup are in locked engagement with each other.

3. An apparatus for mounting a spindle for rotation in a housing, said apparatus comprising:
   a spindle;
   a hollow housing having an upper inner surface and a lower inner surface;
   a lower bearing rotatably mounted on said spindle;
   a mounting cup having a receiving portion for mounting said lower bearing;
   means for securing said mounting cup against said lower inner surface of said housing;
   an opening extending through said lower surface of said housing co-axial with longitudinal axis of said spindle;
   said securing means including clamping means for rotatably engaging said mounting cup, said clamping means having a first portion with a diameter greater than the diameter of said opening and a second portion with a diameter less than the diameter of said opening for rotatably engaging said mounting cup through said opening to clamp said mounting cup against said lower inner surface as said first portion abuts the outer surface of said housing and said second portion abuts against a surface of said housing cup;
   wherein said clamping means includes:
   first teeth formed around the outer circumference of said second portion, said first teeth extending radially outward a predetermined distance from the longitudinal axis of said clamping means and extending longitudinally inward a predetermined distance from said second portion;
   an inner hole formed in the lower end of said cup extending longitudinally at least partway into said cup;
   second teeth formed about the inner circumference in said inner hole at said lower end of said cup, said second teeth extending radially inward a predetermined distance from said inner hole and extending longitudinally inward a predetermined distance from said lower end;
   said first teeth being inserted in the spaces formed between said second teeth and said second teeth being inserted in the spaces between said first teeth so that said second portion can be inserted into said inner hole of said cup;
   spring means to resiliently bias said teeth of said clamping means against said teeth of said cup to restrain said clamping means and said cup from disengaging from each other;
   said predetermined distances being such that after said second portion has been fully inserted into said cup, said cup and said clamping means are rotatable relative to one another to lock said cup and said clamping means from disengagement from each other so that said first portion of said clamping means abuts against the outside of said lower housing surface and said receiving portion of said cup is clamped against said lower inner surface of said housing, and bearing cap means mounted between said spring means and said housing for sealing the interior of said housing from the exterior environment by the spring means biasing said bearing cap means against the exterior of the housing.

4. The apparatus of claim 3 wherein said spring means comprises at least one belleville washer mounted between said clamping means and said cup, and said washer being compressible to form said resilient biasing means as said clamping means and said cup are in locked engagement with each other; and wherein the interior of the housing is sealed from the exterior environment by said belleville washer biasing said bearing cap means against the exterior of the housing.

5. The apparatus of claim 3 wherein said apparatus further comprises:

an upper bearing rotatably mounted on said spindle;

a second mounting cup having a received portion for mounting said upper bearing;

second means for securing said second mounting cup against said upper inner surface of said housing; and an opening extending through said upper surface of said housing co-axial with said longitudinal axis of said spindle;

said second securing means including second clamping means for rotatably engaging said second mounting cup, said second clamping means having a first portion with a diameter greater than the diameter of said upper opening and a second portion with a diameter less than the diameter of said upper opening for rotatably engaging said second mounting cup through said second opening to form a locking engagement between said second clamping means and said second cup so that said lower portion of said second securing means abuts against the outside of said upper housing surface and said receiving portion of said second cup is clamped against said upper inner surface of said housing.

6. An apparatus for mounting a spindle affixed to disks in a housing for a magnetic data storage system, said apparatus comprising:

a bearing for rotatably mounting said spindle;

means for securing said bearing to said housing, said securing means including:

bearing mounting means for mounting said bearing;

bayonet means for engaging said bearing mounting means to secure said bearing mounting means against a surface of said housing;

an inner hole formed in one end of said bearing mounting means and extending longitudinally at least part way into said bearing mounting means;

first teeth portions formed around the inner circumference of said inner hole at said one end, said first teeth portions extending radially inward a predetermined distance and extending longitudinally inward a predetermined distance;

second teeth portions formed spaced about the outer circumference on one end of said bayonet means extending radially outward a predetermined distance and extending longitudinally inward a predetermined distance;

said first teeth portions being inserted in the spaces formed between said second teeth portions so that said one end of said bayonet means can be inserted into said inner hole of said bearing mounting means;

said longitudinally extending predetermined distances being such that after said bayonet means has been fully inserted into said bearing mounting means, said securing means are rotatable a limited distance relative to one another to lock said securing means from separating from one another;

means for applying a consistently uniform axial preload on said bearing securing means to securely attach said spindle to said housing including spring means disposed between said bearing mounting means and said bayonet means, said spring means compressible when said securing means are fully inserted and rotated relative to one another to resiliently bias said first teeth portions and said second teeth portions against one another axially to restrain said bearing mounting means and said bearing means from disengagement so that said first portion of said clamping means abuts against the outside of said lower housing surface and said receiving portion of said cup is clamped against said lower inner surface of said housing; and means for sealing said bearing from contamination from the exterior environment.

7. The apparatus of claim 6 wherein said spring means include at least one belleville washer.

8. The apparatus of claim 6 wherein said sealing means include a bearing cap mounted on the exterior of said housing between said housing and said spring means.

9. A method for mounting a rotatable spindle in a housing for a magnetic data storage disk system using a bayonet spindle mount having a bayonet mounting cup and a bayonet mounting clamp, said method comprising the steps of:

(a) mounting a lower spindle bearing in an upper portion of said bayonet mounting cup;

(b) mounting a bearing cap having a seal on the exterior of the housing aligned with said rotatable spindle;

(c) inserting over a first end of said bayonet mounting clamp a compressible spring means for locking together said bayonet mounting clamp and said bayonet mounting cup;

(d) inserting said first end of said bayonet mounting clamp through the lower surface of said housing and into said bayonet mounting cup so that said spring means is between a head portion formed on the second end of said bayonet mounting clamp and said bearing cap;

(e) applying a force on said head portion of said bayonet mounting clamp to compress said spring means prior to said bayonet mounting clamp being inserted inside said bayonet mounting cup;

(f) inserting said bayonet mounting clamp inside said bayonet mounting cup;

(g) rotating said bayonet mounting clamp relative to said bayonet mounting cup so that said bayonet mount is locked to prevent said bayonet mounting clamp and said bayonet mounting cup from disengaging; and (h) removing said force from said bayonet mounting clamp so that said bayonet mounting clamp and said bayonet mounting cup are locked together under pressure from said print means which axially biases said bearing cap to abut against an outer housing surface while clamping the mounting cup to an inner housing surface.

10. The method of claim 9 wherein step (d) further comprises:
inserting said bayonet mounting clamp through said bearing cap so that said spring means are between said bearing cap and said head portion of said bayonet mounting clamp.

11. The method of claim 10 wherein said spring means include a belleville washer.

12. The method of claim 10 wherein said method further comprises:
mounting an upper spindle bearing in an upper portion of a second bayonet mounting cup;
mounting said second bayonet mounting cup to the upper surface of said housing by a second mounting clamp by repeating the above steps.

13. The method of claim 9 wherein said spring means include a belleville washer.

14. An apparatus for mounting a spindle for rotation in a housing, said apparatus comprising:
a spindle;
a housing for containing said spindle;
bearing means for rotatably mounting said spindle;
a mounting cup having a portion for receiving said bearing means; and
means for clamping said mounting cup to a first inner housing surface; said clamping means including:
a clamp for rotatably engaging said mounting cup, said clamp having a first head means for abutting against an outer housing surface and a second head means for abutting an opposing surface of said mounting cup to clamp said mounting cup to said first inner housing surface as said clamp rotatably engages said mounting cup;
spring means for resiliently biasing said second head means against said mounting cup surface to restrain said clamp and said cup from disengaging from each other and to axially preload said spindle to isolate said spindle and said bearing from vibrations and shock; and
bearing cap means mounted between said spring means and said housing for sealing the interior of said housing from the exterior environment by the spring means biasing said bearing cap means against the exterior of the housing.

* * * * *